(12) United States Patent
Coco et al.

(10) Patent No.: US 11,358,706 B2
(45) Date of Patent: Jun. 14, 2022

(54) AUTOMATED WEIGHT BALANCING FOR AUTOMATED GUIDED VEHICLE

(71) Applicant: The Boeing Company, Chicago, IL (US)

(72) Inventors: Alexander J. Coco, Seattle, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 731 days.

(21) Appl. No.: 16/370,266

(22) Filed: Mar. 29, 2019

(65) Prior Publication Data

US 2020/0307776 A1 Oct. 1, 2020

(51) Int. Cl.
*B64C 17/02* (2006.01)
*G05D 1/00* (2006.01)
*G01G 19/03* (2006.01)
*G05D 1/02* (2020.01)

(52) U.S. Cl.
CPC ........... *B64C 17/02* (2013.01); *G01G 19/035* (2013.01); *G05D 1/0088* (2013.01); *G05D 1/021* (2013.01)

(58) Field of Classification Search
CPC ..... B64C 17/02; G01G 19/035; G05D 1/0088
USPC ........................................................ 702/175
See application file for complete search history.

(56) References Cited

U.S. PATENT DOCUMENTS

| 7,991,521 | B2 | 8/2011 | Stewart | |
|---|---|---|---|---|
| 11,086,314 | B1* | 8/2021 | Ebrahimi Afrouzi | G05D 1/0022 |
| 2017/0308084 | A1* | 10/2017 | Spicer | G05D 1/0295 |
| 2020/0164867 | A1* | 5/2020 | Yu | B60W 10/10 |
| 2020/0283279 | A1* | 9/2020 | Chow | B66F 9/063 |
| 2021/0212249 | A1* | 7/2021 | Disberger | A01D 34/008 |

FOREIGN PATENT DOCUMENTS

| AU | 2018389953 A1 | * | 7/2020 | B63G 8/001 |
|---|---|---|---|---|
| CN | 107708814 A | * | 2/2018 | A63B 22/16 |
| CN | 207640930 U | * | 7/2018 | B63G 8/001 |
| JP | 2004338507 A | * | 12/2004 | B64C 17/02 |
| WO | WO-2019126612 A1 | * | 6/2019 | B64C 17/02 |

* cited by examiner

*Primary Examiner* — Harry K Liu
(74) *Attorney, Agent, or Firm* — Duft & Bornsen, PC

(57) ABSTRACT

Systems and methods for an Automated Guided Vehicle (AGV) capable of automatically balancing large and heavy objects for transport through a facility. One embodiment is an Automated Guided Vehicle (AGV) including a balancing plate configured to support a load, load sensors configured to detect a weight distribution of the load, and an actuator configured to shift the balancing plate laterally. The AGV also includes a weight balancing controller configured to determine a center of gravity of the load based on the weight distribution detected by the load sensors, to determine that the center of gravity of the load is vertically misaligned with a center of gravity of the AGV, and to direct the actuator to shift the balancing plate laterally to move the center of gravity of the load toward vertical alignment with the center of gravity of the AGV.

20 Claims, 10 Drawing Sheets

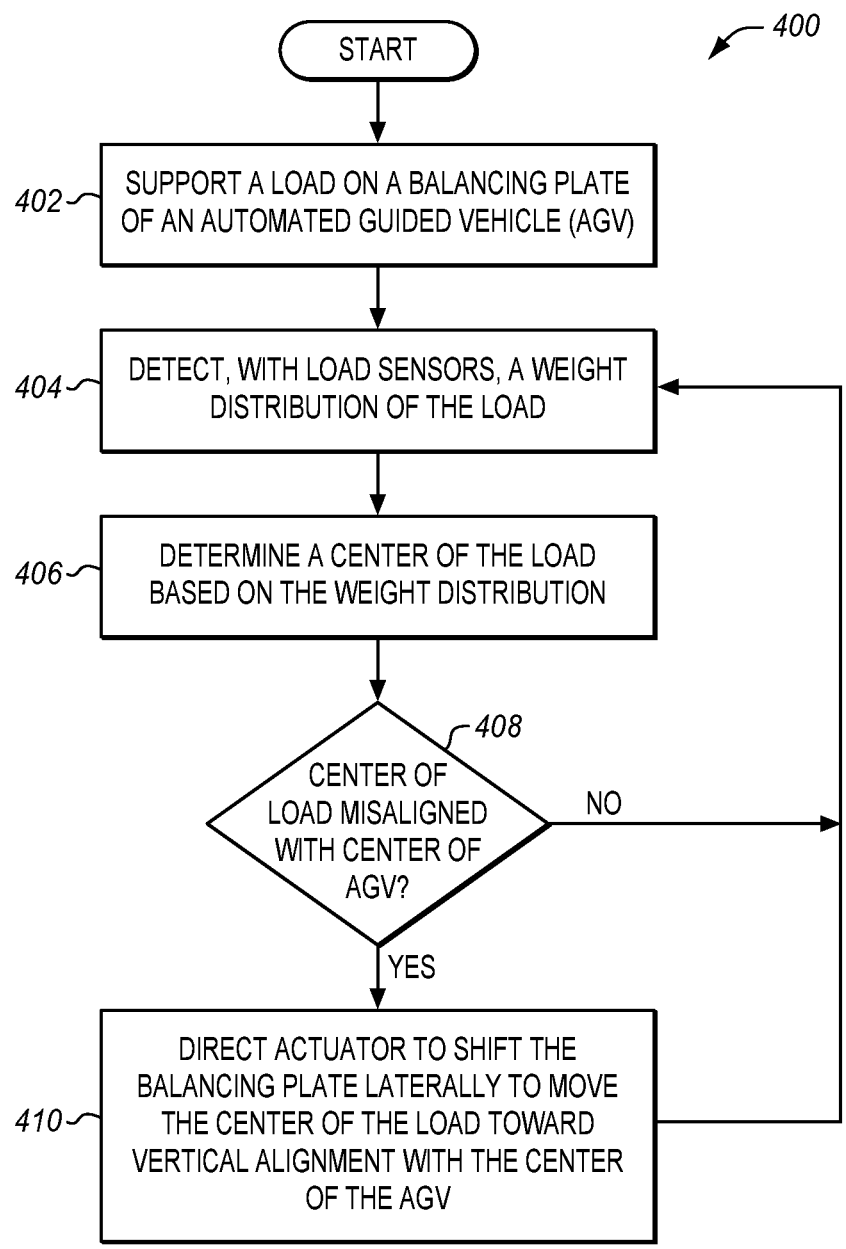

US 11,358,706 B2

AUTOMATED WEIGHT BALANCING FOR AUTOMATED GUIDED VEHICLE

FIELD

This disclosure relates to the field of automated guided vehicles.

BACKGROUND

Automated Guided Vehicles (AGVs) are used in aircraft manufacturing facilities to move materials in an automated fashion. AGVs typically navigate around the facility with a vision system that follows markers on the floor of the facility. Unfortunately, if the load carried by the AGV has an uneven weight distribution, the AGV is at risk of tipping over, potentially causing damage to the load and the AGV.

SUMMARY

Embodiments described herein include an improved AGV capable of automatically balancing large and heavy objects for transport through a facility. The AGV includes a balancing plate that shifts to balance the object over the AGV by detecting a weight distribution of the object. The balancing plate may also be positioned to take into account the self-driving motion, or anticipated self-driving motion, of the AGV. The enhanced AGV provides a technical benefit in transporting objects automatically through a facility with increased safety.

One embodiment is an Automated Guided Vehicle (AGV) including a balancing plate configured to support a load, load sensors configured to detect a weight distribution of the load, and an actuator configured to shift the balancing plate laterally. The AGV also includes a weight balancing controller configured to determine a center of gravity of the load based on the weight distribution detected by the load sensors, to determine that the center of gravity of the load is vertically misaligned with a center of gravity of the AGV, and to direct the actuator to shift the balancing plate laterally to move the center of gravity of the load toward vertical alignment with the center of gravity of the AGV.

Another embodiment is a method that includes supporting a load on a balancing plate of an Automated Guided Vehicle (AGV), detecting, with load sensors, a weight distribution of the load, determining a center of gravity of the load based on the weight distribution, determining that the center of gravity of the load is vertically misaligned with a center of gravity of the AGV, and directing an actuator to shift the balancing plate laterally to move the center of gravity of the load toward vertical alignment with the center of gravity of the AGV.

A further embodiment is an Automated Guided Vehicle (AGV) including a balancing plate configured to support a load, load sensors configured to detect a weight distribution of the load, and an actuator configured to shift the balancing plate laterally. The AGV also includes a weight balancing controller configured, in response to detecting that the AGV is idle, to direct the actuator to laterally move the balancing plate to vertically align a center of the weight distribution of the load with a center of the AGV. The weight balancing controller is further configured, in response to detecting motion data for automatically guiding the AGV, to direct the actuator to laterally move the balancing plate to laterally offset the center of the weight distribution of the load from the center of the AGV based on the motion data.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 4 is a flowchart illustrating a method of automatically balancing a load with an AGV in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
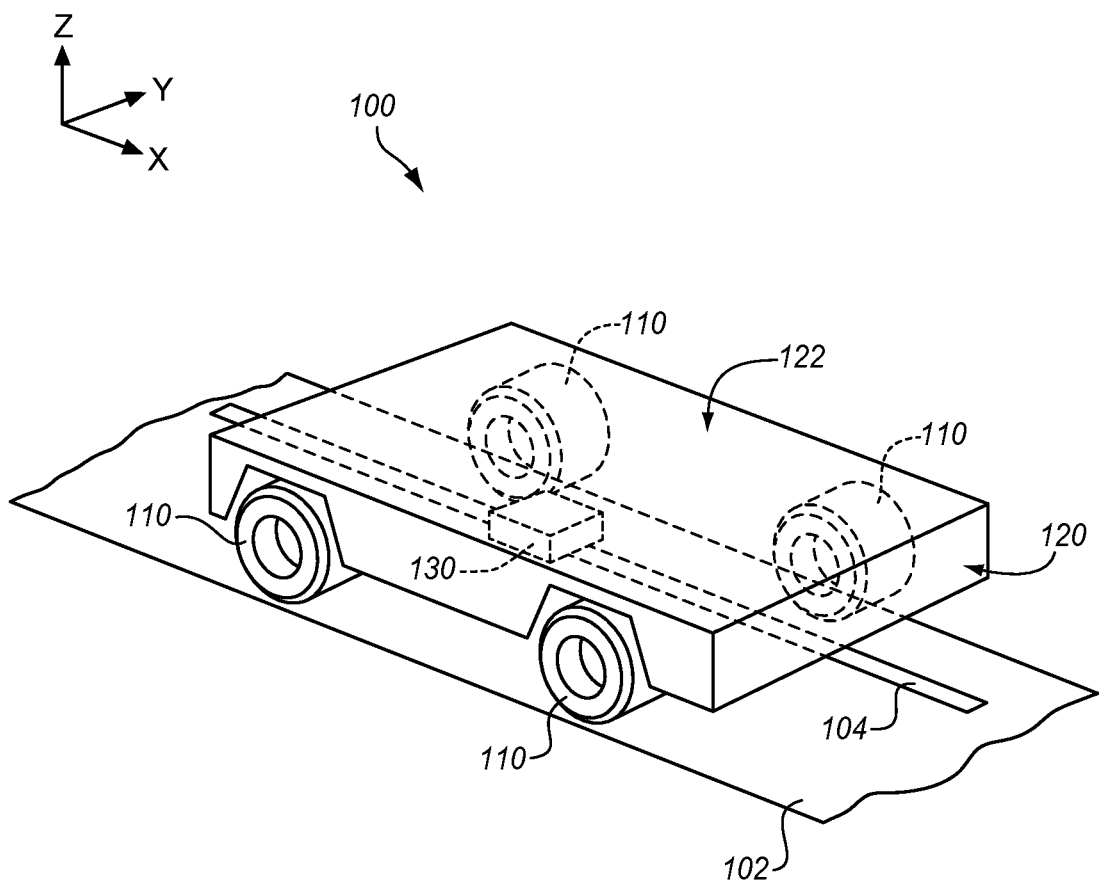
FIG. 1 is a perspective view of an automated guided vehicle (AGV).

FIG. 1 is a perspective view of an Automated Guided Vehicle (AGV) 100. Generally, the AGV 100 is a self-navigating vehicle configured to transport objects throughout a facility. The facility may thus include a floor 102, or ground, having a predetermined route 104 for the AGV 100 to follow. The AGV 100 includes wheels 110, a frame 120, and a platform 122 to support and transport one or more objects, referred to as a load, resting on the platform 122 of the AGV 100.

Additionally, the AGV 100 includes an Automatic Driving System (ADS) 130 to automatically navigate along the predetermined route 104. For example, the ADS 130 may include sensors to detect navigation marks on the floor 102 defining the predetermined route 104. Alternatively or additionally, the ADS 130 may navigate according to an on-board positioning system (e.g., Global Positioning System (GPS), etc.) and/or vision system (e.g., cameras, etc.).

The AGV 100 is thus capable of carrying objects around the facility in an automated fashion. However, in an aircraft manufacturing facility, certain aircraft components, such as ducts and engine parts, comprise large, bulky objects that can have a significant amount of weight toward one side, or even hanging off the side, of the platform 122 of the AGV 100. An uneven weight distribution of the load may create a tipping risk to the AGV 100 as it drives in automated fashion through the facility.

Figure 2:
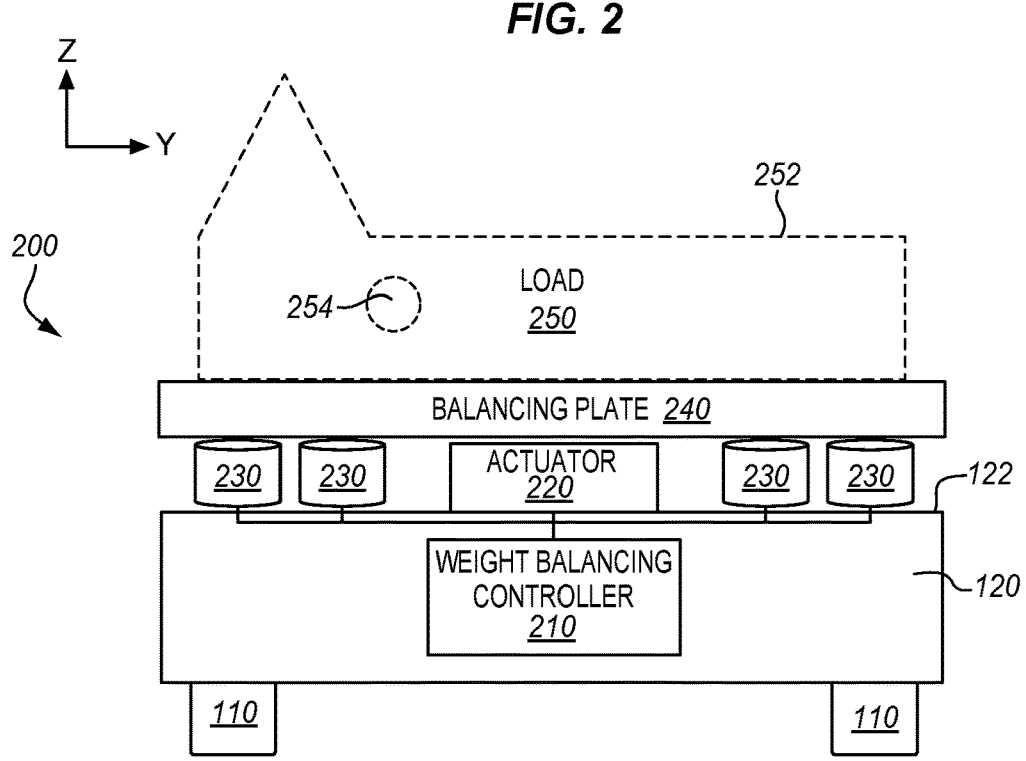
FIG. 2 is a front view diagram of an Automated Guided Vehicle (AGV) enhanced with automated weight balancing in an illustrative embodiment.

FIG. 2 is a front view diagram of an Automated Guided Vehicle (AGV) 200 enhanced with automated weight balancing in an illustrative embodiment. The AGV 200 addresses the above-described problems by automatically balancing its load using a weight balancing controller 210, one or more actuators 220, one or more load sensors 230, and a balancing plate 240. The balancing plate 240 is configured to support a load 250 to be transported automatically through a facility by the AGV 200. The actuators 220 include any system or devices configured to move the balancing plate 240 in at least one direction to balance the load 250. The load sensors 230 include any system or devices configured to detect a weight distribution of the load 250.

The weight balancing controller 210 is coupled with the actuators 220 and the load sensors 230 and configured to shift the balancing plate 240, and thus the load 250, into a balanced alignment with the AGV 200. For instance, as shown in this example, the load 250 may have a weight distribution 252 that is uneven and a center of gravity 254 that is initially misaligned with respect to the AGV 200. The weight balancing controller 210 is configured to automatically balance the load 250 with respect to the AGV 200 as shown and described below with respect to FIG. 3.

Figure 3:
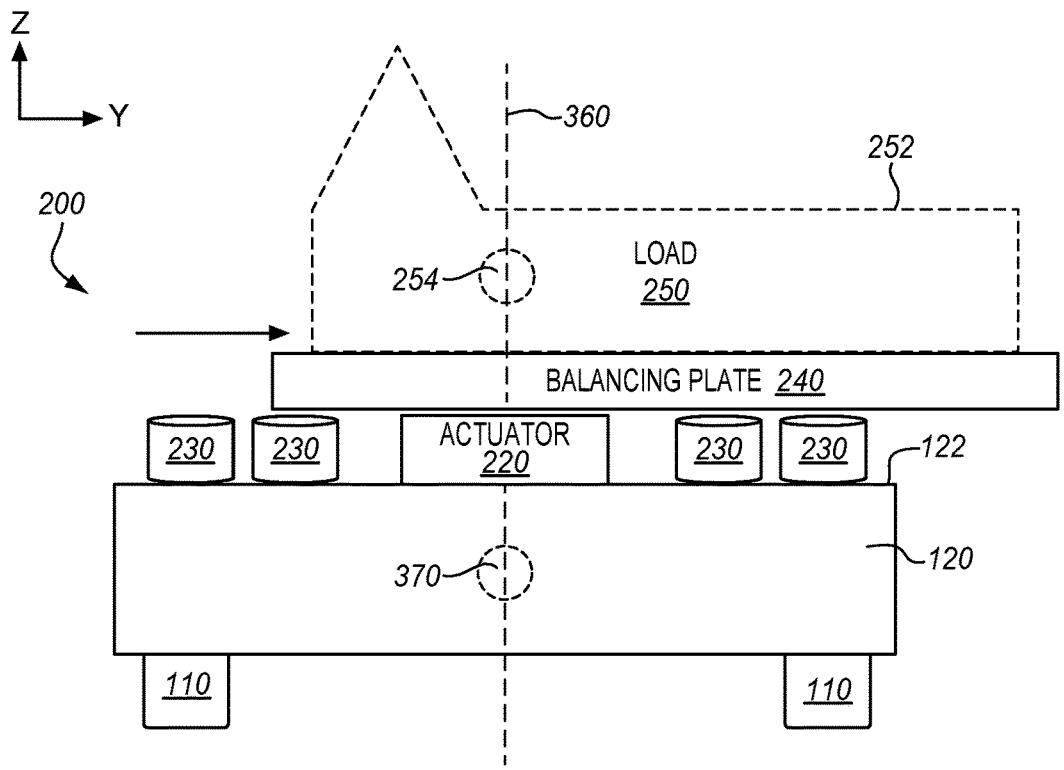
FIG. 3 is a front view diagram illustrating the AGV automatically balancing a load in an illustrative embodiment.

FIG. 3 is a front view diagram illustrating the AGV 200 automatically balancing the load 250 in an illustrative embodiment. The weight balancing controller 210 directs the actuators 220 to move the balancing plate 240 laterally (e.g., in the x-y plane) based on the weight distribution of the load 250 detected by the load sensors 230. In doing so, the weight balancing controller 210 positions the center of gravity 254 of the load 250 into a vertical alignment 360 with a center of gravity 370 of the AGV 200. The center of gravity 370 of the AGV 200 may define a lateral center (e.g., in the x-y plane) of the frame 120 and/or body of the AGV 200. The weight balancing controller 210 is not shown in FIG. 3 for visual clarity. The AGV 200 thus automatically aligns the load 250 to eliminate potential tipping risk in supporting and transporting the load 250. The AGV 200 can therefore advantageously transport the load 250 in an automated fashion through a facility more quickly and cheaply, with increased safety, and less human oversight.

FIG. 4 is a flowchart illustrating a method 400 of automatically balancing a load with the AGV 200 in an illustrative embodiment. The steps of method 400 are described with reference to the AGV 200 of FIGS. 2-3, but those skilled in the art will appreciate that the method 400 may be performed in other AGVs. The steps of the flowcharts described herein are not all inclusive, may include other steps not shown, and may be performed in an alternative order.

In step 402, the load 250 is supported on the balancing plate 240. In step 404, the load sensors 230 detect the weight distribution 252 of the load 250. In step 406, the weight balancing controller 210 determines the center of gravity 254 of the load 250 based on the weight distribution 252 detected by the load sensors 230. For example, the weight balancing controller 210 may determine the center of gravity 254 of the load 250 based on weight differences reported by the load sensors 230.

In step 408, the weight balancing controller 210 determines whether the center of gravity 254 of the load 250 is misaligned with the center of gravity 370 of the AGV 200. If so, the method 400 proceeds to step 410, and the weight balancing controller 210 directs one or more actuators 220 to shift the balancing plate 240 laterally to move the center of gravity 254 of the load 250 toward vertical alignment with the center of gravity 370 of the AGV 200. Otherwise, if the load 250 is aligned with the AGV 200 in step 408, the method 400 returns to step 404 to continue monitoring the weight distribution of the load 250. Steps 404-410 may repeat to continuously align the balancing plate 240, and thus the load 250, with the AGV 200. The method 400 provide a technical benefit over prior AGVs by automatically balancing the load 250 on the AGV 200.

Figure 5A:
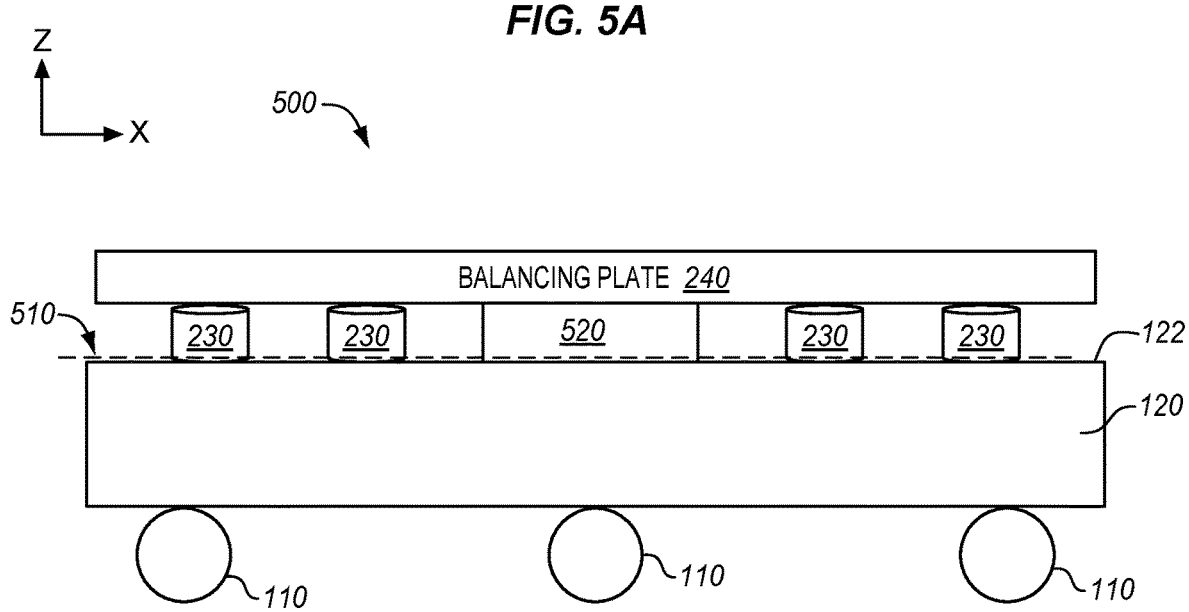
FIG. 5A is a side view of an AGV in an illustrative embodiment.
Figure 5B:
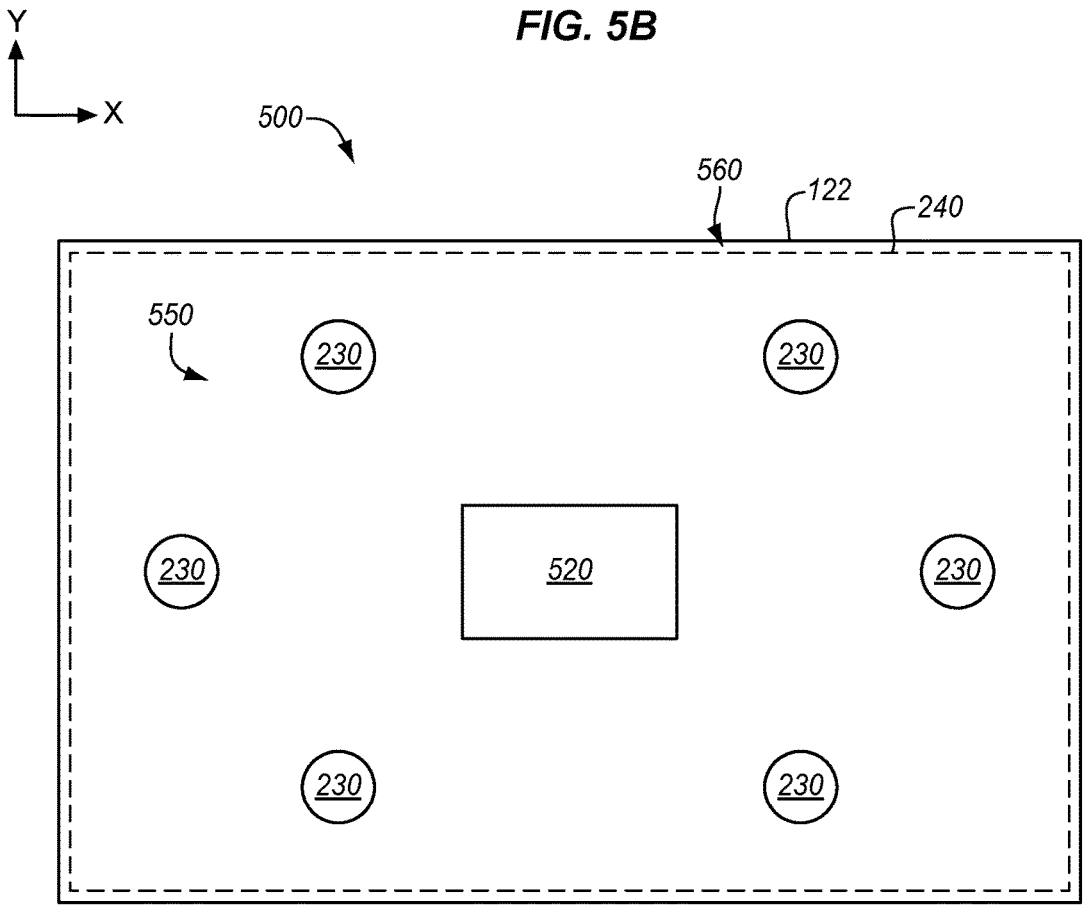
FIG. 5B is a top view of an AGV in an illustrative embodiment.

FIG. 5A is a side view of an AGV 500 in an illustrative embodiment. FIG. 5B is a top view of the AGV 500 in an illustrative embodiment. As shown in FIG. 5A, the load sensors 230 may be disposed on the same plane 510 as a single actuator 520. In this example, the plane 510 is in an x-y plane between the platform 122 and the balancing plate 240. Additionally, in this example, the load sensors 230 are fixed to the AGV 200 (e.g., the platform 122) and disposed underneath the balancing plate 240. The single actuator 520 is also disposed underneath the balancing plate 240 and configured to shift the balancing plate 240 laterally (e.g., x-y directions), or in some embodiments, all three axes. The load sensors 230 are in contact with the balancing plate 240 but do not impede lateral motion of the balancing plate 240.

Additionally, as shown in FIG. 5B, with the load sensors 230 disposed on the same plane 510 as the single actuator 520, the load sensors 230 may disposed in a configuration 550 laterally outward from the single actuator 520 and disposed around the single actuator 520. In other words, the single actuator 520 is centralized to the load sensors 230 and/or the platform 122. The single actuator 520 supports the balancing plate 240 above the platform 122. In a default position 560 (e.g., with no load or initially after loading), the balancing plate 240 aligns and/or centers with the platform 122. The balancing plate 240 may include a plate body having dimensions that match or correspond with the platform 122 of the AGV 500. After receiving/detecting a load placed on the balancing plate 240, the balancing plate 240 moves from the default position 560 to a position offset with the platform 122 (or frame 120) that balances the load with respect to the AGV 600.

Figure 6A:
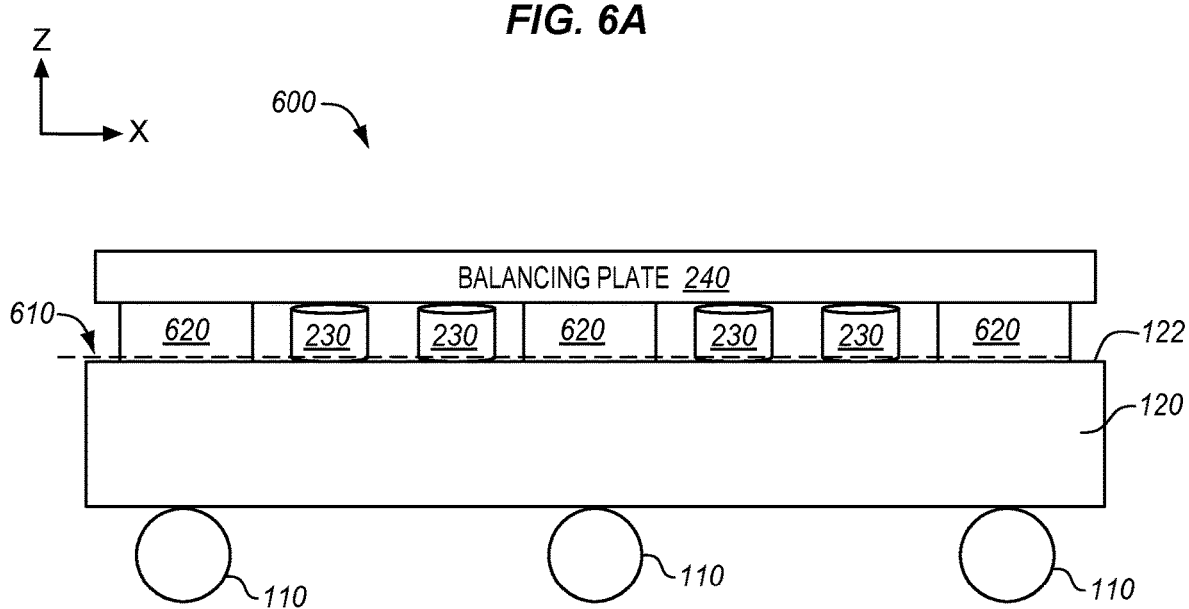
FIG. 6A is a side view of an AGV in another illustrative embodiment.
Figure 6B:
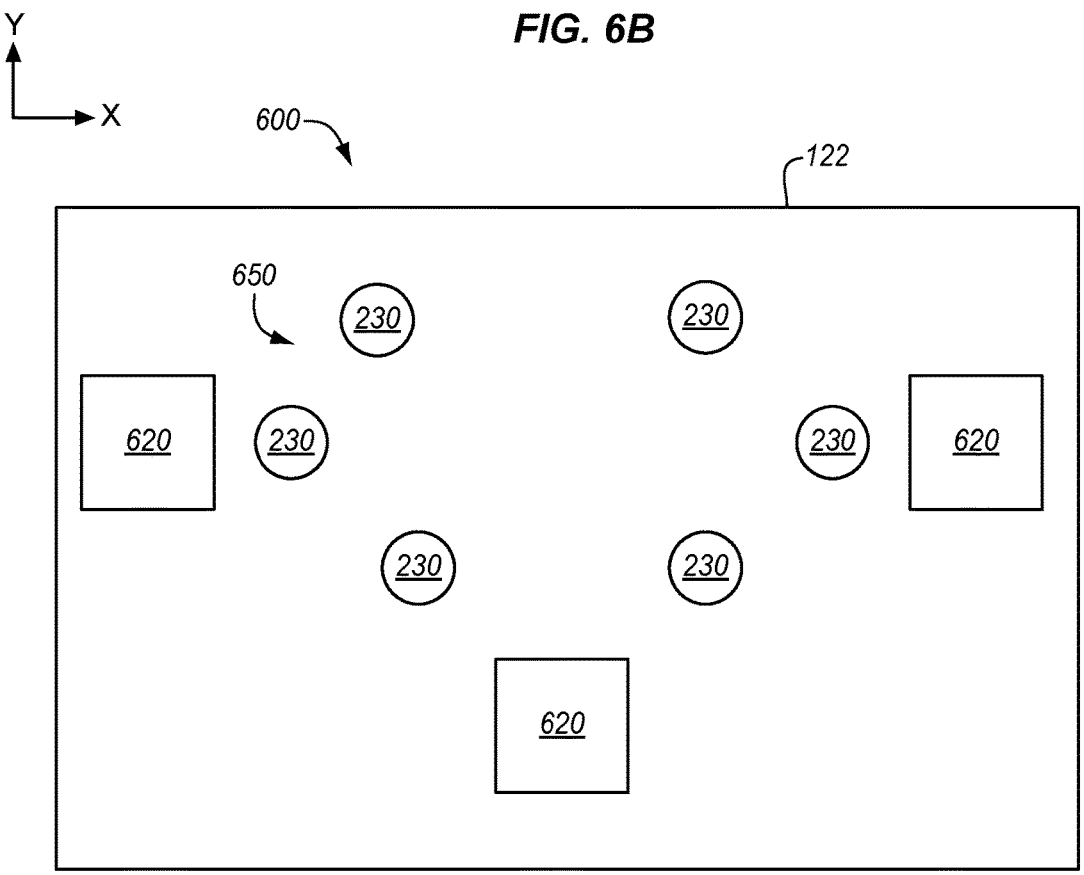
FIG. 6B is a top view of an AGV in another illustrative embodiment

FIG. 6A is a side view of an AGV 600 in another illustrative embodiment. FIG. 6B is a top view of the AGV 600 in another illustrative embodiment. In this example, the load sensors 230 are disposed on the same plane 610 as a plurality of actuators 620. Additionally, as shown in FIG. 6B, the load sensors 230 may disposed in a configuration 650 laterally inward from the plurality of actuators 620 and thus between the actuators 620. In other words, the plurality of actuators 620 are decentralized to the load sensors 230 and/or the platform 122. Compared with the configuration 550 described above with respect to FIGS. 5A-5B, in the configuration 650 the load sensors 230 are spaced or bunched together more tightly. Additionally, each of the plurality of actuators 620 may control movement of the balancing plate 240 in one axis or more if redundancy is desired.

Figure 7A:
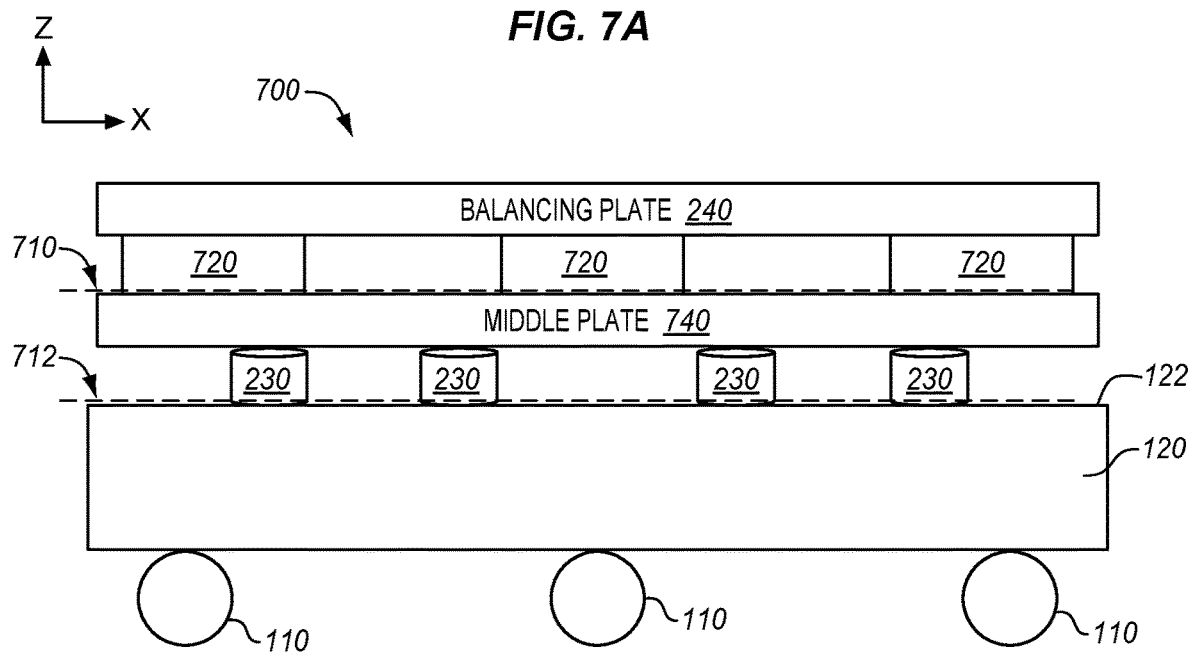
FIG. 7A is a side view of an AGV in yet another illustrative embodiment.
Figure 7B:
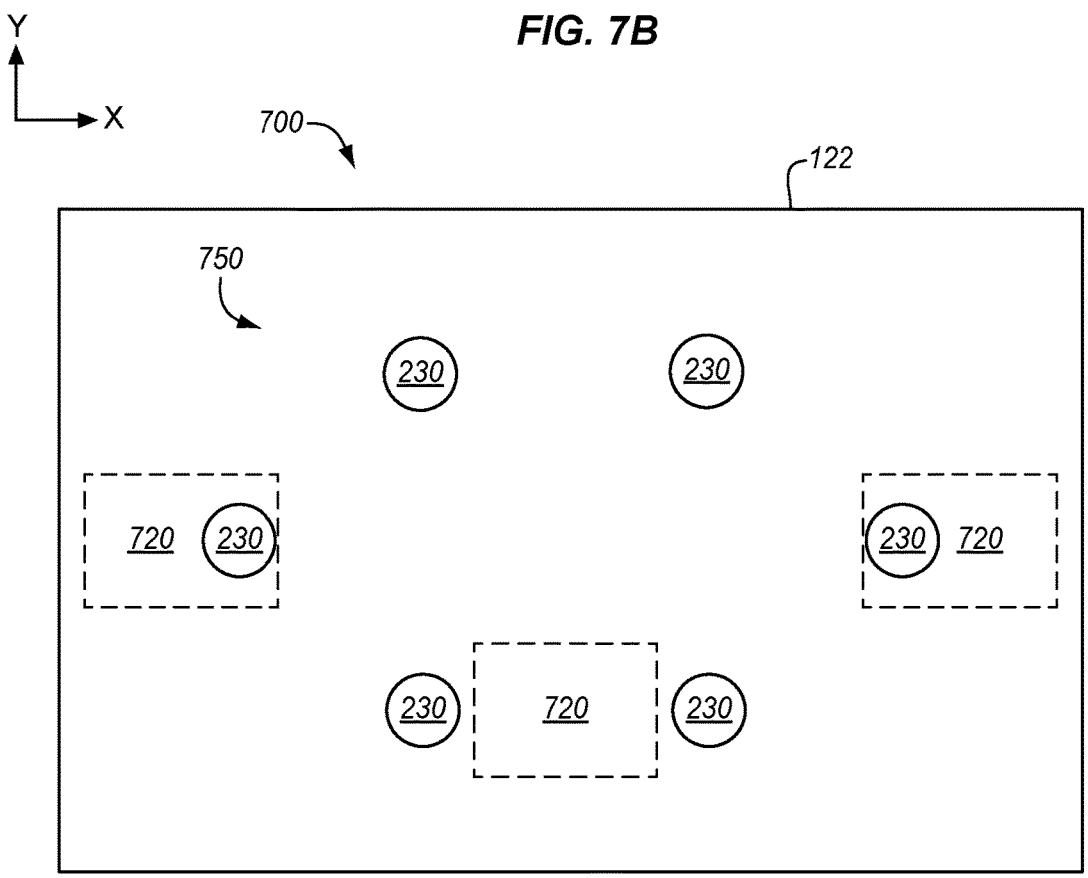
FIG. 7B is a top view of an AGV in yet another illustrative embodiment.

FIG. 7A is a side view of an AGV 700 in yet another illustrative embodiment. FIG. 7B is a top view of the AGV 700 in yet another illustrative embodiment. In this example, the actuators 720 and the load sensors 230 are disposed on different vertical planes. For example, as shown in FIG. 7A, the AGV 700 further includes a middle plate 740 between the balancing plate 240 and the frame 120 or platform 122. The actuators 220 are disposed in an upper plane 710 underneath the balancing plate 240 and on top of the middle plate 740. The load sensors 230 are disposed in a lower plane 712 underneath the middle plate 740 and on top of the platform 122.

In this example, the middle plate 740 and the load sensors 230 are fixed relative to the frame 120 of the AGV 700. The actuators 720 move the balancing plate 240 relative to the frame 120 of the AGV 700. Additionally, as shown in FIG. 7B, the load sensors 230 may disposed in a configuration 750 in which one or more of the load sensors 230 overlap laterally with one or more of the actuators 720.

Figure 8:
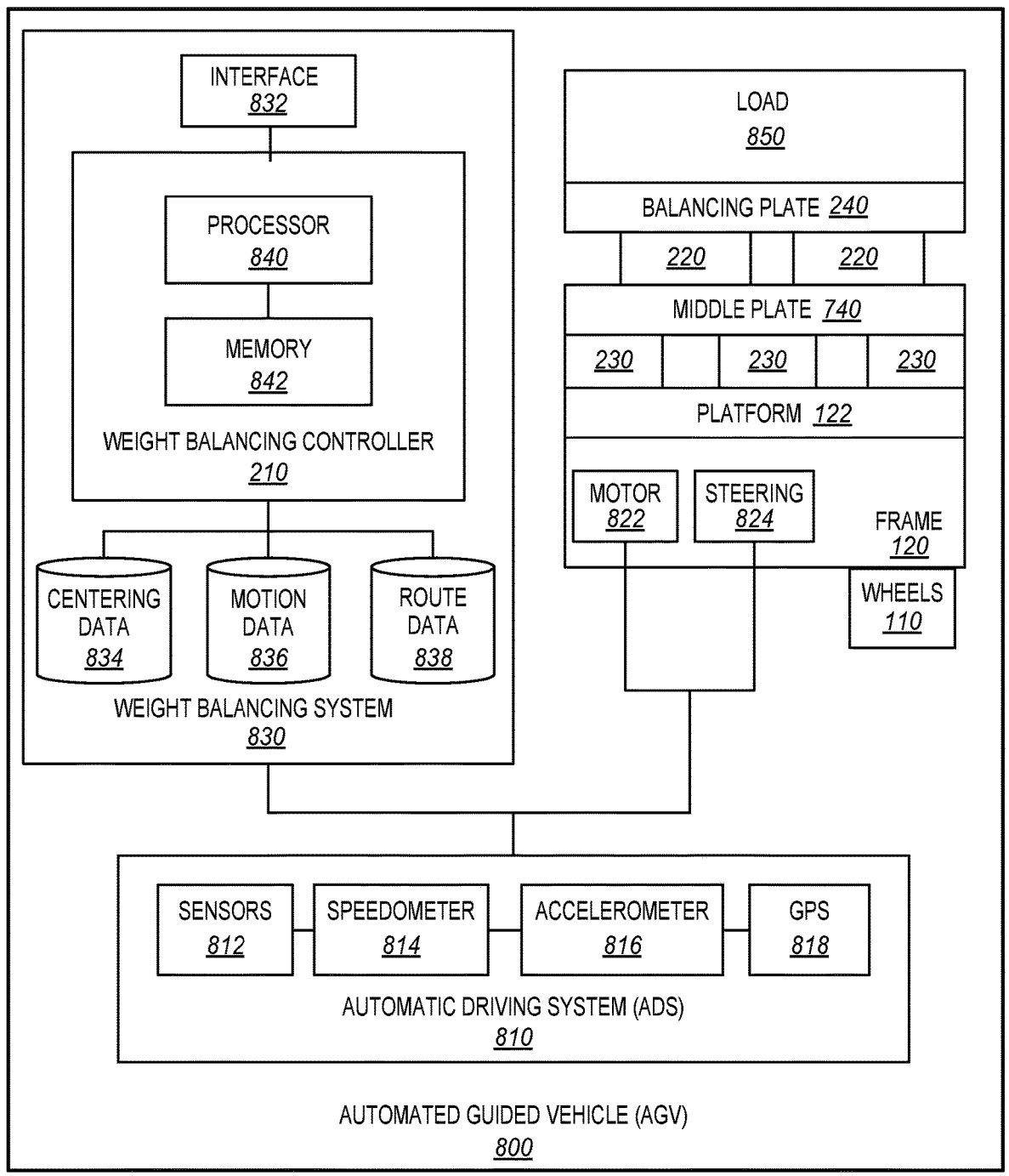
FIG. 8 is a block diagram of an AGV in an illustrative embodiment.

FIG. 8 is a block diagram of an AGV 800 in an illustrative embodiment. As shown in FIG. 8, the AGV 800 includes an Automated Driving System (ADS) 810 including one or more sensors 812, speedometers 814, accelerometers 816, and/or Global Positioning System (GPS) 818. The ADS 810 controls a motor 822 and steering 824 to guide the AGV 800 automatically along its route through the facility.

Additionally, the AGV 800 includes a weight balancing system 830 including or coupled with an interface 832 for receiving wired or wireless data input for balancing a load 850. In particular, the interface 832 may receive, for storage in memory, centering data 834, motion data 836, and/or route data 838. Centering data 834 may include operator input or settings regarding a center point or location (e.g., the center of gravity 370) of the AGV 800, and/or an alignment threshold or range. The motion data 836 and/or the route data 838 may include data obtained or accessed from the ADS 810. The weight balancing controller may direct one or more actuators 220 to drive the balancing plate 240 and position the load 850 based on feedback from the load sensors 230 in combination with one or more of data 834-838.

The weight balancing controller 210 may be implemented by hardware, software, or some combination thereof. For example, the weight balancing controller 210 may include a processor 840 which includes any electronic circuits and/or optical circuits that are able to perform functions. The processor 840 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. The weight balancing controller 210 may also include memory 842, which may include any electronic circuits, optical circuits, and/or magnetic circuits that are able to store data.

Figure 9:
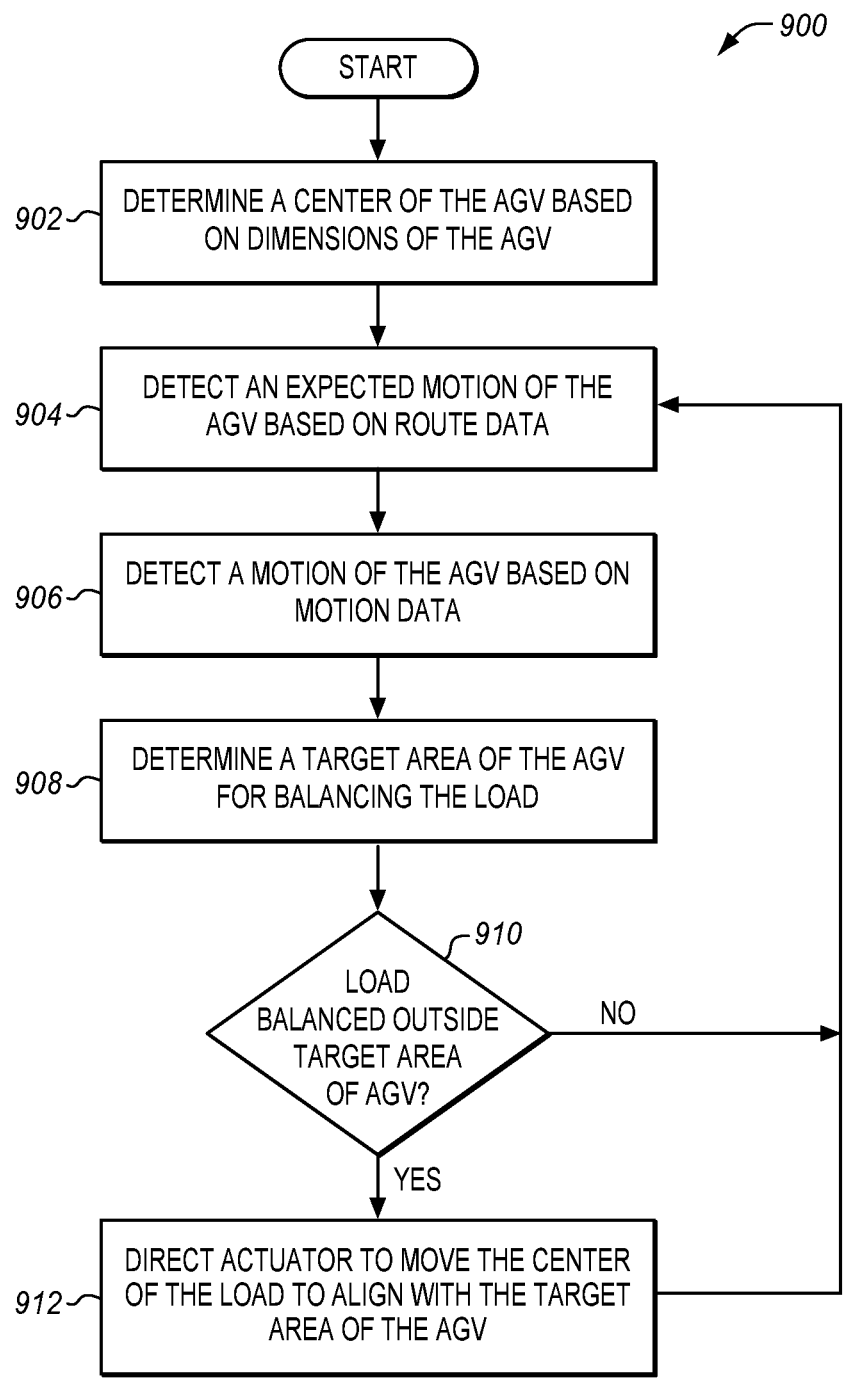
FIG. 9 is a flowchart illustrating a method of automatically balancing a load with an AGV in an illustrative embodiment.

FIG. 9 is a flowchart illustrating a method 900 of automatically balancing a load with the AGV 800 in an illustrative embodiment. The method 900 includes additional or alternative steps to that described in the method 400 of FIG. 4. The steps of method 900 are described with reference to the AGV 800 of FIG. 8, but those skilled in the art will appreciate that the method 900 may be performed in other AGVs. The steps of the flowcharts described herein are not all inclusive, may include other steps not shown, and may be performed in an alternative order.

In step 902, the weight balancing controller 210 determines the center of the AGV 800 based on dimensions of the AGV 800. For example, the weight balancing controller 210 may obtain centering data 834 comprising operator input or settings indicating dimensions of the frame 120 of the AGV 800. The weight balancing controller 210 may process dimensions of the AGV 800 to determine the center of the AGV 800. Alternatively or additionally, the weight balancing controller 210 may obtain a center or target location of the AGV 800 for balancing the load, and/or an alignment threshold or range indicating an allowable lateral distance between the center of the load 850 and a target/center of the AGV 800.

In step 904, the weight balancing controller 210 detects, from route data 838 of the AGV 800 via the ADS 810, an expected motion of the AGV 800. For example, the weight balancing controller 210 may obtain information from the GPS 818 to detect a stop, slow down, acceleration, or turn that is upcoming. Alternatively or additionally, in step 906, the weight balancing controller 210 detects, from motion data 836 of the AGV 800 via the ADS 810, a motion of the AGV 800. For example, the weight balancing controller 210 may obtain information from one or more accelerometers 816 to detect a stop, slow down, acceleration, or turn in real-time.

In step 908, the weight balancing controller 210 determines a target load position for balancing the load 850 with respect to the center of the AGV 800. The weight balancing controller 210 may determine the target load position based on a lateral center or center of mass/gravity of the AGV 800, a lateral center or center of mass/gravity of the load 850, an expected motion of the AGV 800, a motion of the AGV 800, or some combination thereof. Alternatively or additionally, the weight balancing controller 210 may determine the target load position for the load 850 to be laterally offset a distance from the center of gravity of the AGV 800 to compensate for anticipated motion and/or real-time motion of the AGV 800 as it transports the load 850 along its route.

In step 910, the weight balancing controller 210 determines whether the load 850 is balanced outside the target load position of the AGV 800. For example, the weight balancing controller 210 may process weight values received from the load sensors 230 and corresponding coordinate values of the locations of the load sensors 230 to determine a lateral coordinate defining the lateral center of gravity of the load 850. Additionally, the weight balancing controller 210 may modify or update the target load position based on an expected motion or motion to determine in real-time whether the load 850 is properly positioned with respect to the AGV 800. The weight balancing controller 210 may also take into account the alignment threshold or range indicating an allowable lateral distance between the center of the load 850 and the target load position of the AGV 800.

If, in step 910, the result is yes, the method 900 proceeds to step 912 and the weight balancing controller 210 directs one or more actuators 220 to move the center of gravity of the load 850 to align with the target load position. Otherwise, the method 900 returns to step 904 to continue monitoring the motion and expected motion of the AGV 800. Because the target load position determined in step 908 may be continuously adjusted to take into account the motion and/or expected motion of the AGV 800, the weight balancing controller 210 is configured to direct the actuators 220 to shift the balancing plate 240 laterally to move the load 850 based on the motion of the AGV 800, and/or to direct the actuators 220 to shift the balancing plate 240 laterally to move the load 850 based on the expected motion of the AGV 800.

Figure 10:
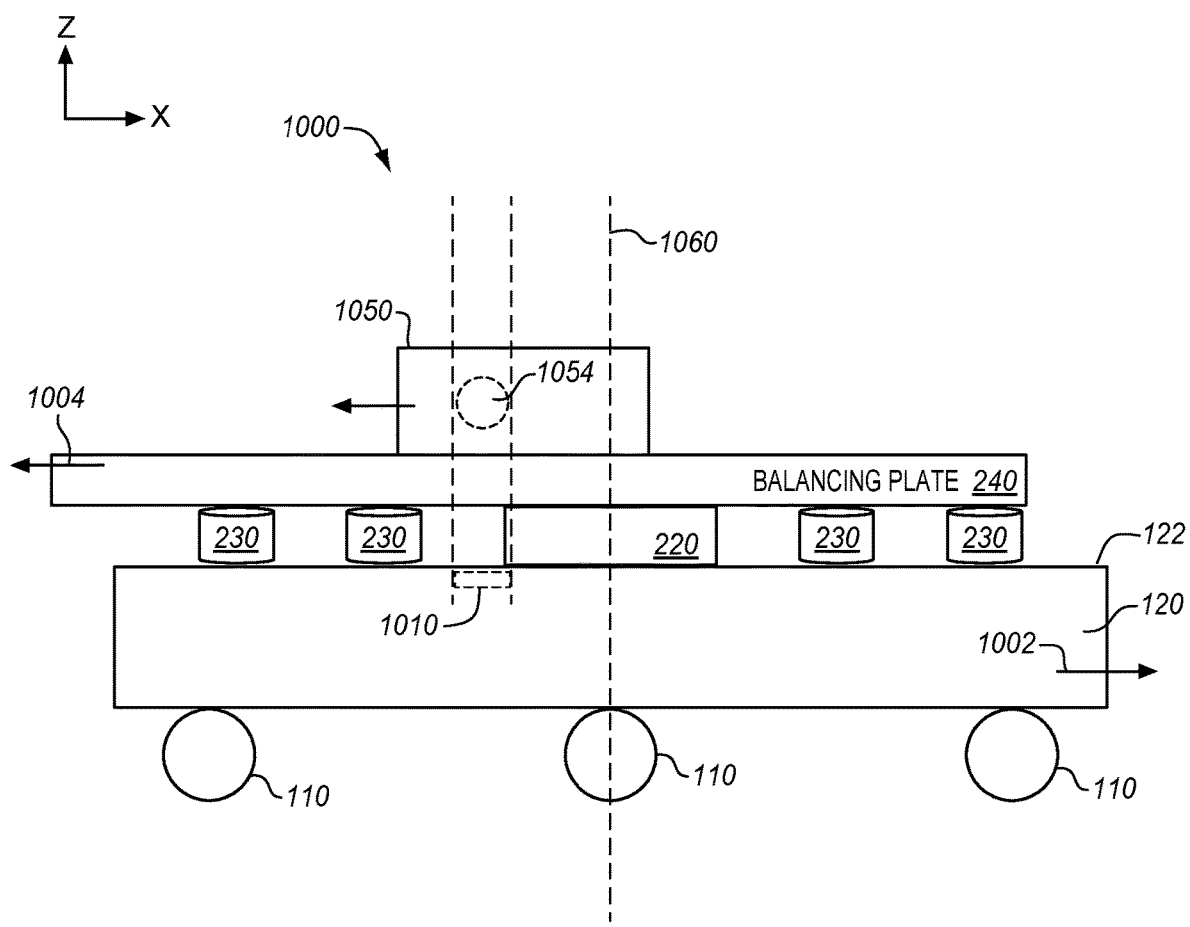
FIG. 10 is a diagram of an AGV configured to balance a load based on a motion or expected motion of the AGV in an illustrative embodiment.

FIG. 10 is a diagram of an AGV 1000 configured to balance a load 1050 based on a motion or expected motion of the AGV 1000 in an illustrative embodiment. Assume, for this embodiment, that the AGV 1000 is traveling in a forward direction as indicated by arrow 1002. The weight balancing controller 210 automatically adjusts a target load position 1010 according motion data of the AGV 1000. The target load position 1010 includes a lateral area in an x-y plane for positioning a center of gravity 1054 of the load 1050 vertically over the lateral area.

In this example, in response to detecting a deceleration, slow down, or stop, the weight balancing controller 210 adjusts the target load position 1010 backward a distance from a center 1060 of the AGV 1000 to prepare for an expected stopping motion and/or to counteract a real-time stopping motion. Thus, the weight balancing controller 210 directs the actuator 220 to move the balancing plate 240 backward, as indicated by arrow 1004, in relation to a direction of travel of the AGV 1000 in response to detecting deceleration of the AGV 1000. The AGV 1000 therefore moves the center of gravity 1054 of the load 1050 backward to fit within the adjusted target load position 1010, as shown in FIG. 10.

The target load position 1010 may also be adjusted according to turn angles, acceleration, speed, etc. that is expected or detected for the route or detected for the AGV 1000. That is, the weight balancing controller 210 is configured, in response to detecting motion data for automatically guiding the AGV 1000, to direct the actuator 220 to laterally move the balancing plate 240 to laterally offset the center of gravity 1054 of the load 1050 from the center of the AGV 1000 based on the motion data. For example, the weight balancing controller 210 may direct the actuator 220 to move the balancing plate 240 forward in relation to a direction of travel of the AGV 200 in response to detecting acceleration of the AGV 1000. Alternatively or additionally, the weight balancing controller 210 may direct the actuator 220 to move the balancing plate 240 in a side direction in relation to a direction of travel of the AGV 1000 in response to detecting a turn of the AGV 1000.

Alternatively or additionally, in response to detecting that the AGV 1000 is idle, loading, or traveling at a constant velocity, the weight balancing controller 210 may direct the actuator 220 to laterally move the balancing plate 240 to vertically align the center of the weight distribution of the load 1050 with the center 1060 of the AGV 1000. Thus, the target load position 1010 may or may not correspond with a center 1060 of the AGV 1000. As earlier described, the motion data may be obtained from sensors onboard the AGV 1000 and/or from a predetermined route for automatically guiding the AGV 1000. In embodiments where the stopping motion is detected from predetermined route data, the weight balancing controller 210 may determine a delay in moving the balancing plate 240 to correspond with a timing of the stopping motion.

Figure 11:
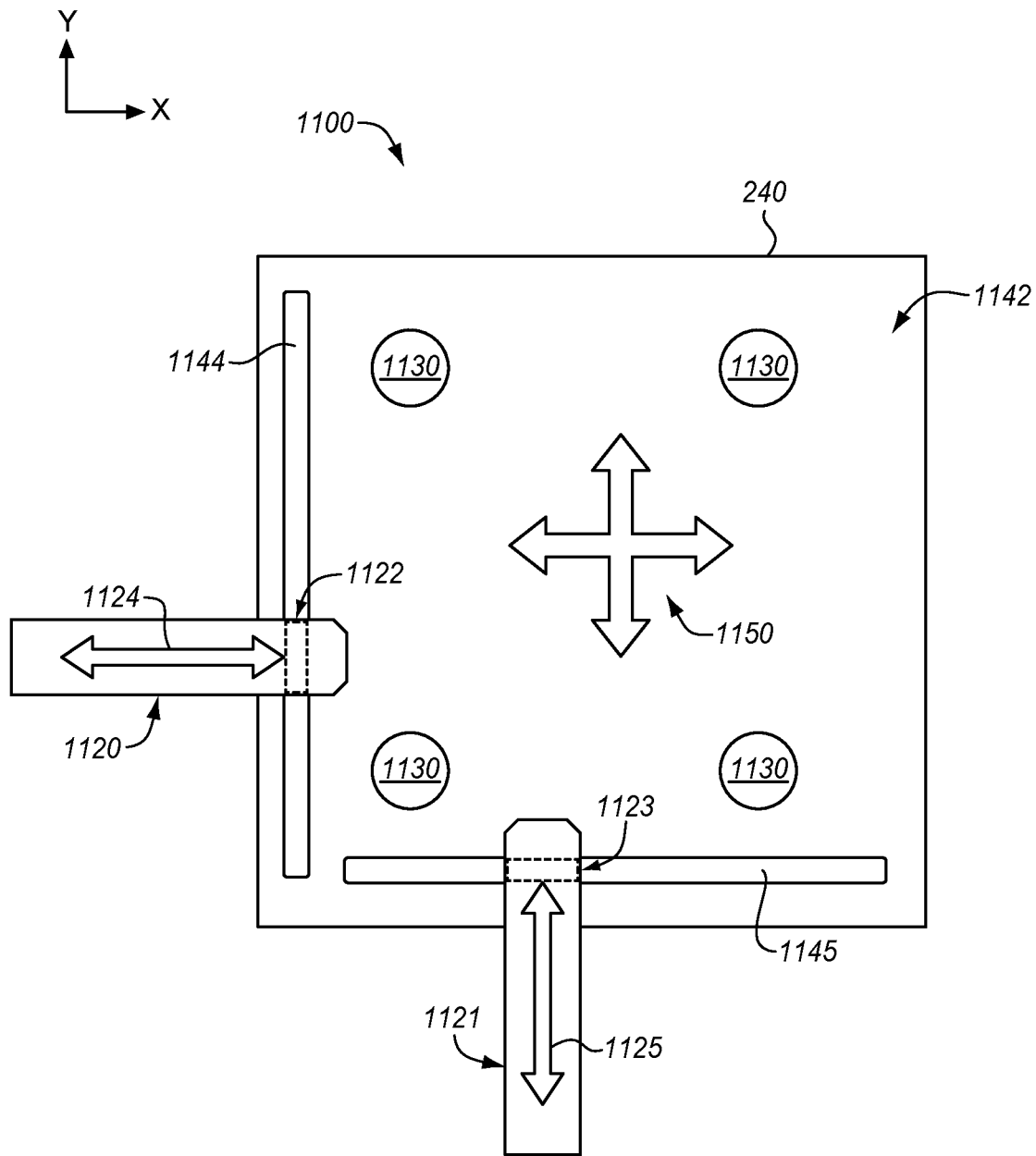
FIG. 11 is a bottom view of an AGV in another illustrative embodiment.

FIG. 11 is a bottom view of an AGV 1100 in another illustrative embodiment. In particular, FIG. 11 shows that a bottom side 1142 of the balancing plate 240 includes grooves 1144-1145 for rollers 1122-1123 of respective actuators 1120-1121. The grooves 1144-1145 each extend along one side of the balancing plate 240 to allow for motion of the balancing plate 240 in a direction perpendicular to the groove 1144-1145. For instance, actuation of a first actuator 1120 in a first direction 1124 (e.g., x direction) slides the balancing plate 240 in the first direction 1124 via a second groove 1145 that guides a second roller 1123 of the second actuator 1121. Conversely, actuation of a second actuator 1121 in a second direction 1125 (e.g., y direction) slides the balancing plate 240 in the second direction 1125 via a first groove 1144 that guides a first roller 1122 of the first actuator 1120. The actuators 1120-1121 are thus configured to slide the balancing plate 240 in a two-dimensional plane (e.g., x-y plane), as indicated by arrows 1150.

Alternatively or additionally, the actuators 1120-1121 may be connected to the balancing plate 240 to push/pull the balancing plate 240. The actuators 1120-1121 may include linear electric actuators having a motor to convert electricity into mechanical torque. Alternatively or additionally, the actuators 1120-1121 may include toothed belts, lead screws, rack and pinion sets, and/or a direct drive voice coil. Additionally, the actuators 1120-1121 and load sensors 1130 may be fixed or attached relative to the frame 120 or platform 122 of the AGV 1100. Examples of the load sensors 1130 include low profile load cells, canister load cells, S-beam load cells, miniature compression load cells, force sensors, etc.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. An Automated Guided Vehicle (AGV) comprising:
   a balancing plate configured to support a load;
   load sensors configured to detect a weight distribution of the load;

an actuator configured to shift the balancing plate laterally; and
a weight balancing controller configured to determine a center of gravity of the load based on the weight distribution detected by the load sensors, to determine that the center of gravity of the load is vertically misaligned with a center of gravity of the AGV, and to direct the actuator to shift the balancing plate laterally to move the center of gravity the load toward vertical alignment with the center of gravity of the AGV.

2. The AGV of claim 1 wherein:
the actuator and the load sensors are located on a same plane that is underneath the balancing plate and on top of a frame of the AGV.

3. The AGV of claim 2 wherein:
the actuator is configured to move the balancing plate in multiple axes, and
the load sensors are disposed around the actuator.

4. The AGV of claim 2 further comprising:
multiple actuators,
wherein the load sensors are disposed between the multiple actuators.

5. The AGV of claim 1 further comprising:
a middle plate between the balancing plate and the frame; and
one or more actuators disposed underneath the balancing plate and on top of the middle plate,
wherein the load sensors are disposed underneath the middle plate and on top of a frame of the AGV.

6. The AGV of claim 1 wherein:
the weight balancing controller is configured to obtain motion data for the AGV, and to direct the actuator to shift the balancing plate laterally to move the load based on a combination of the motion data and the center of gravity of the load with respect to the AGV.

7. The AGV of claim 6 wherein:
the weight balancing controller is configured to position the center of gravity of the load behind the center of gravity of the AGV in response to detecting that the AGV is stopping.

8. The AGV of claim 1 wherein:
the weight balancing controller is configured to obtain route data for the AGV, and to direct the actuator to shift the balancing plate laterally to move the load based on a combination of the route data and the center of gravity of the load with respect to the AGV.

9. The AGV of claim 1 wherein:
the weight balancing controller is configured to direct the actuator to vertically align the center of gravity of the load with the center of gravity of the AGV.

10. A method comprising:
supporting a load on a balancing plate of an Automated Guided Vehicle (AGV);
detecting, with load sensors, a weight distribution of the load;
determining a center of gravity of the load based on the weight distribution;
determining that the center of gravity of the load is vertically misaligned with a center of gravity of the AGV; and
directing an actuator to shift the balancing plate laterally to move the center of gravity of the load toward vertical alignment with the center of gravity of the AGV.

11. The method of claim 10 further comprising:
determining a target load position for balancing the load based on the center of gravity of the AGV and a motion of the AGV; and
directing the actuator to shift the balancing plate laterally to move the load to center over the target load position.

12. The method of claim 10 further comprising:
detecting, from route data of the AGV, an expected motion of the AGV;
determining a target load position of the AGV for balancing the load based on the center of gravity of the AGV and the expected motion of the AGV; and
directing the actuator to shift the balancing plate laterally to move the load to center over the target load position.

13. The method of claim 10 further comprising:
determining the center of gravity of the AGV based on dimensions of the AGV.

14. The method of claim 10 further comprising:
determining a target load position for balancing the load based on the center of gravity of the AGV and an alignment threshold.

15. An Automated Guided Vehicle (AGV) comprising:
a balancing plate configured to support a load;
load sensors configured to detect a weight distribution of the load;
an actuator configured to move the balancing plate laterally; and
a weight balancing controller is configured, in response to detecting that the AGV is idle, to direct the actuator to laterally move the balancing plate to vertically align a center of the weight distribution of the load with a center of the AGV,
the weight balancing controller further configured, in response to detecting motion data for automatically guiding the AGV, to direct the actuator to laterally move the balancing plate to laterally offset the center of the weight distribution of the load from the center of the AGV based on the motion data.

16. The AGV of claim 15 wherein:
the weight balancing controller is further configured to direct the actuator to move the balancing plate backward in relation to a direction of travel of the AGV in response to detecting deceleration of the AGV.

17. The AGV of claim 15 wherein:
the weight balancing controller is further configured to direct the actuator to move the balancing plate forward in relation to a direction of travel of the AGV in response to detecting acceleration of the AGV.

18. The AGV of claim 15 wherein:
the weight balancing controller is further configured to direct the actuator to move the balancing plate in a side direction in relation to a direction of travel of the AGV in response to detecting a turn of the AGV.

19. The AGV of claim 15 wherein:
the weight balancing controller is further configured to direct the actuator to move the balancing plate to center the weight distribution of the load over the center of the AGV in response to detecting a constant velocity of the AGV.

20. The AGV of claim 15 wherein:
the weight balancing controller is further configured to obtain the motion data from a predetermined route for automatically guiding the AGV.

* * * * *